United States Patent

[11] 3,607,756

[72] Inventor Wendell F. Phillips
 Moorestown, N.J.
[21] Appl. No. 715,419
[22] Filed Mar. 22, 1968
[45] Patented Sept. 21, 1971
[73] Assignee Campbell Soup Company
 Camden, N.J.

[54] HEAT TRANSFER LIQUID AND USE
 15 Claims, 2 Drawing Figs.
[52] U.S. Cl..................................................... 252/73,
 252/70
[51] Int. Cl....................................................... C09k 3/00,
 C09k 3/18
[50] Field of Search........................................... 252/67, 69,
 70, 71, 73, 74, 75, 78, 76; 260/340.2

[56] References Cited
 UNITED STATES PATENTS
2,766,258 10/1956 Malkemus................... 260/340.2
2,894,957 7/1959 Anderson et al............. 260/340.2
2,379,249 6/1945 Muskat......................... 252/67 X
2,431,885 12/1947 Palmer......................... 252/67 X
3,332,980 7/1967 Leary et al.................... 252/70 X

OTHER REFERENCES

" Propylene Carbonate" Technical Bulletin Jefferson Chem. Co., Jan 13, 1960

" Beware The Wrong Deicing Fluid" Reprint by Union Carbide from Business/Commercial Aviation March, 1963— pg. GOM4

Primary Examiner—Leon D. Rosdol
Assistant Examiner—D. Silverstein
Attorney—Howson and Howson ABSTRACT: A liquid composition, having a freezing point well below the freezing point of water and adapted for use as a liquid heat transfer composition at low temperatures, is provided which consists essentially of propylene glycol, propylene carbonate and water, in defined proportions. Typical advantageous uses for the composition include use as a defrosting and as a coolant (including freezing) liquid.

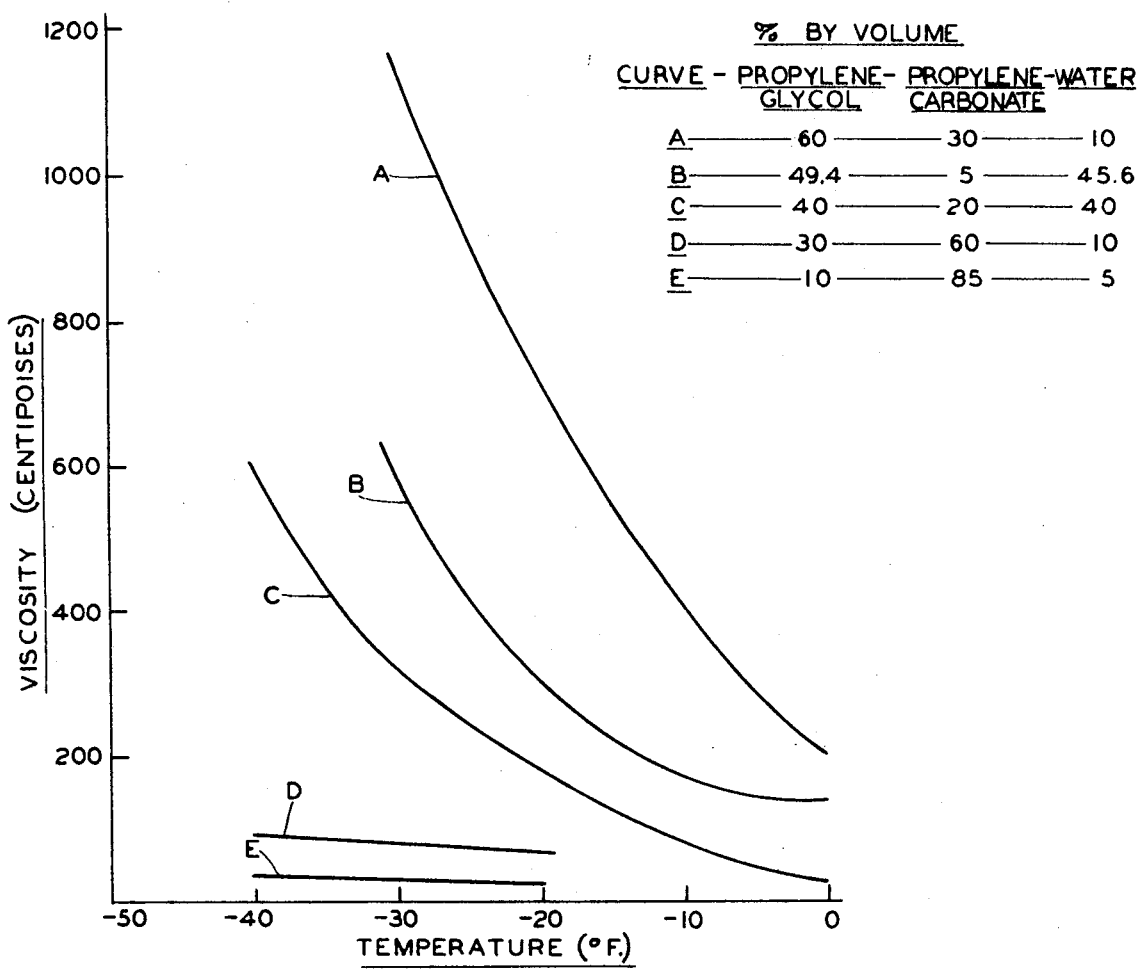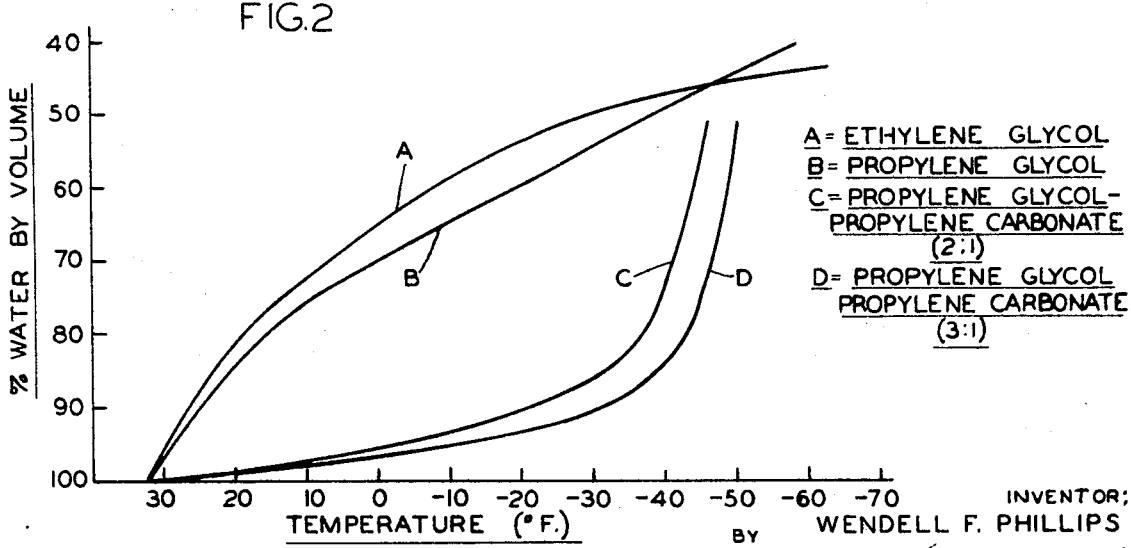

3,607,756

HEAT TRANSFER LIQUID AND USE

BACKGROUND OF THE INVENTION

Liquids for use as heat transfer media where such liquids will encounter temperatures below the freezing point of water are typified by ethylene glycol, propylene glycol, denatured alcohol and various combinations of these with water. These possess limitations as is well known and as will be apparent from the following discussion.

In refrigeration and freezing units where material, such as foodstuff, is frozen or maintained in a refrigerated or frozen condition by circulating chilled air and the air is chilled for such use by passage over cooling coils, one of the principal problems is the formation of ice on the cooling coils (including fins) by condensation and freezing of the moisture from the air. To inhibit such formation of ice, it has been common practice to spray a defrosting liquid onto the cooling coils to remove the moisture, ideally as fast as it is formed. A mixture of ethylene glycol and water was used for this purpose for many years. However, in recent years the toxicity of ethylene glycol has become of concern. Since the defrosting liquid comes into direct contact with the circulating air, there is always the possibility that a small amount of the ethylene glycol entrained in the air could contaminate the material or its container. Hence, its use has been discontinued particularly in systems where exposure to edible materials is involved. Attempts to employ propylene glycol in place of ethylene glycol have led to serious difficulties. The principal of these is the unduly high viscosity, at low temperatures, of propylene glycol-water mixtures. In order to use such mixtures either the equipment, such as pumps, nozzles, etc. would have to be changed or the system would have to be operated at higher temperatures. In addition, it was found that propylene glycol-water mixtures, as was also the case with ethylene glycol-water mixtures, are corrosive to metals unless the solution is buffered at an alkaline pH of 9 or higher. Nevertheless, propylene glycol has the advantage over ethylene glycol of presenting no toxicity problems since it is generally recognized as safe under applicable law, and thus could be used safely, particularly where exposure to edible material is involved.

It is the principal object of the present invention to provide a novel liquid composition especially adapted for use as a heat transfer medium at low temperatures.

It is another object of the present invention to provide a liquid composition which presents no toxicity problems and can safely be used in systems involving edible materials, especially foods and beverages.

It is still another object of the present invention to provide a liquid heat transfer composition, adapted for use at low temperatures, which is essentially noncorrosive toward most common metals, not only at low temperatures but also at elevated temperatures.

It is a further object of the present invention to provide a novel liquid heat transfer composition, adapted for use at low temperatures, which normally requires no buffering material.

These and other objects, including the provision of novel methods of application, will become apparent from a consideration of the following specification and claims.

SUMMARY OF THE INVENTION

The novel composition of the present invention consists essentially of from about 5 to about 65%, by volume, of propylene glycol, from about 4 to about 85%, by volume, of propylene carbonate, and from about 5 to about 55%, by volume, of water.

BRIEF DESCRIPTION OF THE DRAWING

In the drawing FIG. 1 is a series of curves, for compositions of the invention, in which viscosity is plotted against temperature; and FIG. 2 sets forth general freezing point curves for two typical compositions of the invention and for ethylene glycol and propylene glycol in water. The freezing point referred to in connection with these curves and hereinafter is that temperature at which the solution becomes opaque by virtue of the formation of microcrystals of ice. The mixture, at this point, is not solid as a whole.

The composition of the present invention has many significant advantages over prior compositions of the same type. In the first place, it remains as a clear liquid at temperatures well below the freezing point of water, the exact freezing point of the composition depending, of course, upon the proportions of the various components. FIG. 2 illustrates general freezing point curves for two typical compositions of the invention (C and D) and the differences between these and general freezing point curves for ethylene glycol (A) and propylene glycol (B) in water will be noted. Most important, however, is the relatively low viscosity of the compositions at temperatures ranging down to −45° F. and lower. The low viscosity of the compositions as well as the ability to alter the relative proportions of the three main components relatively widely to provide characteristics desired in any particular system are surprising in view of the known characteristics of propylene glycol-water mixtures and propylene carbonate-water mixtures. As stated previously propylene glycol-water mixtures have relatively high viscosities at low temperatures. For example, 70:30 (by volume) propylene glycol-water mixture has a viscosity of about 5,000 c.p.s. at −30° F. and a viscosity of about 2,000 c.p.s. at −20° F. (A 70:30 ethylene glycol-water mixture, on the other hand, has a viscosity of only about 400–500 c.p.s. at −30° F.). As will be seen from the viscosity curves in FIG. 1 of the drawing, the presence of the propylene carbonate markedly reduces the viscosity of the propylene glycol-water combination; or, to put it another way, the three component mixture has a markedly lower viscosity at low temperatures than the two component propylene glycol-water combination. Propylene carbonate and water, on the other hand, have only limited miscibility. Thus water is soluble only to the extent of about 8% in propylene carbonate at room temperature. The present compositions can tolerate much more water, particularly when the proportion, by volume, of propylene glycol to propylene carbonate is greater than 1:1, and it appears that the propylene glycol acts as a solubilizing agent. Neither propylene glycol nor propylene carbonate present toxicity problems. Degradation of the propylene carbonate that might occur results primarily in the formation of propylene glycol and carbon dioxide. Of importance also is the fact that the composition is essentially noncorrosive to metals with which it would normally come into contact. Corrosion tests have shown that the composition is satisfactory for use in contact with galvanized iron, black steel and copper. The composition requires no pH adjustment or buffering materials; in fact, buffering at an alkaline pH can be detrimental in causing degradation of the propylene carbonate. The composition appears to be self-buffering that, if the pH of the material is adjusted to above 7.2, the pH will eventually drop back to about 7.1–7.2, presumably through degradation of some of the propylene carbonate. In general, the present composition as used will have a pH in the substantially neutral range; that is, from about 6.5 to about 7.5. Another significant advantage is using the composition of this invention as a defrosting liquid for refrigeration and freezing systems wherein materials like foodstuffs are contacted with chilled air is that the present composition appears to be less hygroscopic than ethylene glycol- and propylene glycol-water mixtures. This means that the composition, as compared to ethylene glycol-and propylene glycol-water mixtures, absorbs less water from the circulating air, and, thus, the resulting air is less dehydrated and has a lesser dehydrating effect upon the material it contacts. Another advantage of the present composition over alcohol is their safety from the standpoint of combustion since they are nonflammable at room temperature. The present composition also appears to be a more efficient defrosting liquid than, for example, an ethylene glycol-water mixture. Whereas patches of ice were found to form around a cooling coil (including the fins) when the ethylene glycol-water mixtures were used as the defrosting fluid, such ice formation in the same system is substantially reduced (or eliminated altogether) by the present composition thus permitting much better air circulation and movement. This also means that less work is required to move a given volume of air.

The novel combination of properties of the present composition gives rise to important uses where one or more of these advantageous properties are utilized. These uses may be grouped into two main embodiments.

DESCRIPTION OF THE PREFERRED EMBODIMENTS

Embodiment 1 may be generally classified as a defrosting application. In this application the composition is primarily required to give up heat contained therein to a colder body after which it becomes reheated (absorbs heat) upon recirculation.

In defrosting applications, a cold surface on which ice would otherwise form to a deleterious extent, such as the cooling coils (including fins) of a refrigeration or freezing unit, is contacted with the composition, as by spraying the composition thereon, to wash away condensed moisture and dissolve ice as it forms. The composition is recovered and recycled for further use. However, since the composition becomes cooled it must be rewarmed, and since it picks up moisture it would eventually accumulate an undesirable amount of water. Hence in recirculating the defrosting composition it is normally heated to a temperature (above 212° F. and up to 260° F.) causing evaporation of that amount of water that the composition picks up during each cycle. Such defrosting applications are encountered in, for example, holding boxes or cold storage rooms, air blast freezers, partial vacuum freezing units, frozen food lockers, and the like.

Embodiment 2 may be generally classified as a liquid cooling medium. In this case, the composition is required to absorb heat from a body of material to cool it. For example air, or other gas, may be cooled by contacting it with the composition of the present invention, at a temperature below 0° F., as by passing the gas through a body of the liquid composition. Solid materials may be cooled by contact with the present liquid composition; for example a packaged moisture-containing material may be immersed in the liquid to cause freezing thereof. Such an application is in, for example, an immersion-type freezer where material, like a foodstuff, and usually in a container, is immersed in the present composition until frozen. Another example of this embodiment is the use of the present composition as an antifreeze coolant in, for example, an internal combustion engine. In its environment in the cooling system, the composition encounters temperatures below the freezing point of water, although at times when the system is not in operation, and hence must still have a low viscosity and low freezing point. In this embodiment of use, the composition, after it has performed after it has performed its cooling function, is circulated for reuse during which recirculation it is rechilled.

When the composition is to be used in applications where it will reach a temperature no lower than −30 to −35° F., it is preferred for economic reasons that the composition have a proportion of propylene glycol to propylene carbonate greater than 1:1 (by volume). A particularly preferred ratio of propylene glycol to propylene carbonate in this connection is from about 2:1 to about 3:1. Such composition preferably consists essentially of from about 40 to about 65%, by volume, of propylene glycol; from about 3 to about 30% of propylene carbonate, and from about 20 to about 50% of water. The particularly preferred compositions in this embodiment consist essentially of from about 45 to about 60% of propylene glycol; from about 20 to about 30% of propylene carbonate, and from about 20 to about 40% of water.

When the composition is to be used in applications where it will reach a temperature below −30 to −35° F., it is preferred that the composition have a proportion of propylene carbonate to propylene glycol of greater than 1:1 (by volume).

Such composition preferably consists essentially of from about 5 to about 45%, by volume, of propylene glycol; from about 20 to about 85% of propylene carbonate, and from about 5 to about 25% of water.

The present invention will be more readily understood from a consideration of the following specific examples which are given for the purpose if illustration only and are not to be considered as limiting the scope of the invention in any way.

Examples 1–12

Typical compositions are illustrated in the following table:

| Example: | Composition (percent/v.) | | | Specific gravity (at 60° F.) | Freezing point (° F.) |
|---|---|---|---|---|---|
| | PG[1] | PC[1] | H₂O | | |
| 1 | 50 | 5 | 45 | 1.045–1.065 | −31.7 |
| 2 | 50 | 10 | 40 | 1.05–1.07 | −47 |
| 3 | 55 | 15 | 30 | 1.07–1.09 | −48 |
| 4 | 40 | 20 | 40 | 1.077 | −48 |
| 5 | 50 | 25 | 25 | 1.087 | −44 |
| 6 | 10 | 80 | 10 | 1.180 | >−60 |
| 7 | 50 | 15 | 35 | 1.07 | −57.3 |
| 8 | 40 | 5 | 55 | 1.0512 | −15.6 |
| 9 | 40 | 10 | 50 | 1.0613 | −21.8 |
| 10 | 40 | 15 | 45 | 1.0695 | −28.6 |
| 11 | 60 | 5 | 35 | 1.0618 | −58.8 |
| 12 | 60 | 10 | 30 | 1.0721 | −60.5 |

[1] PG is propylene glycol and PC is propylene carbonate.

EXAMPLE 13

A solution composed of 45%, by volume, U.S.P. propylene glycol (unbuffered), 5% propylene carbonate (unbuffered) and 50% water was used for a period of over 6 months as a defrosting fluid in a batch-type airblast freezer of commercial size. The solution was sprayed on the cooling coils, inside of which flowed ammonia at about −20° F. The solution was recycled, passing through a heater where it became heated to about 220° F. with the evaporation of water, before being resprayed on to the coils. The coils were kept free of ice. At the end of various periods of time a sample of the solution was taken, tested and analyzed. The results were as follows:

| Period (days): | pH | Specific gravity (at 60° F.) | Viscosity (−40° F., cps.) | Composition (percent/v.) | | |
|---|---|---|---|---|---|---|
| | | | | PG | PC | H₂O |
| 6 | 7.2 | 1.055 | ca. 400 | 48 | 5.1 | 46.9 |
| 34 | 7.2 | 1.054 | ca. 400 | 48.3 | 5.7 | 46.0 |
| 65 | 7.1 | 1.053 | ca. 400 | 48 | 5.7 | 46.3 |
| 97 | 7.1 | 1.054 | ca. 400 | 49 | 5.5 | 45.5 |
| 210 | 6.9 | 1.054 | ca. 400 | 48.7 | 4.0 | 47.3 |

During this period analyses of the samples showed less than 0.5 p.p.m. of copper and less than 1.0 p.p.m. of iron. The foregoing results show the stability of the liquid and also its noncorrosive character.

EXAMPLES 14–20

The compositions set forth in the following table have been used as defrosting liquids in continuous tunnel-type airblast freezers of commercial size in which ammonia, at −35 to −40° F., is circulated through the cooling coils. The liquids, in a continuously recirculating system, are sprayed onto the cooling coils, collected, heated as needed to 220–250° F. in a concentrator to remove water, flowed in heat-exchange relationship with cold defrosting liquid coming from the cooling coils to preheat that liquid and to cool the liquid flowing from the concentrator, and again sprayed onto the cooling coils:

| | Composition (%/v.) | | |
|---|---|---|---|
| Ex. | PG | PC | H₂O |
| 14 | 54.5 | 5.8 | 39.7 |
| 15 | 52.6 | 18.3 | 29.1 |
| 16 | 58.8 | 17.1 | 24.1 |
| 17 | 66.5 | 15.3 | 18.2 |
| 18 | 41.2 | 22.5 | 36.3 |
| 19 | 36.5 | 17.0 | 46.5 |
| 20 | 64.1 | 22.0 | 13.9 |

EXAMPLE 21

In this example canned soup is frozen by passing the cans through a solution, at −25 to −30° F., composed of 43.3% by volume, U.S.P. propylene glycol (unbuffered), 26% propylene carbonate (unbuffered) and 30.7% water. The cans are at about 150–180° F. upon entering the liquid, remain therein for about 45 minutes and are at about −20° F. upon leaving the liquid.

In operating at a higher throughput requiring a liquid at −45° F., a solution composed of 30%, by volume, propylene glycol, 60% propylene carbonate and 10% water is more desirable from the standpoint of viscosity.

Modification is possible in the particular proportions of materials and in the techniques employed in its use without departing from the scope of the invention.

What is claimed is:

1. A liquid heat transfer composition for use at temperatures below the freezing point of water which consists essentially of from about 5 to about 65%, by volume, of propylene glycol, from about 4 to about 85%, by volume of propylene carbonate and from about 5 to about 55%, by volume, of water.

2. The composition of claim 1 wherein the proportion, by volume, of said propylene glycol to said propylene carbonate is greater than 1:1.

3. The composition of claim 2 wherein the proportion of propylene glycol to propylene carbonate is from about 2:1 to about 3:1.

4. The composition of claim 1 wherein said propylene glycol is present in an amount from about 40 to about 65%, said propylene carbonate is present in an amount from about 5 to about 30%, and said water is present in an amount from about 20 to about 50%.

5. The composition of claim 4 wherein the proportion, by volume, of said propylene glycol to said propylene carbonate is from about 2:1 to about 3:1.

6. The composition of claim 4 wherein said propylene glycol is present in an amount from about 45 to about 60%, said propylene carbonate is present in an amount from about 20 to about 30%, and said water is present in an amount from about 20 to about 40%.

7. The composition of claim 6 wherein the proportion, by volume, of said propylene glycol to said propylene carbonate is from about 2:1 to about 3:1.

8. The composition of claim 1 wherein the proportion, by volume, of said propylene carbonate to said propylene glycol is greater than 1:1.

9. The composition of claim 1 wherein said propylene glycol is present in an amount from about 5 to about 45%, said propylene carbonate is present in an amount from about 20 to about 85%, and said water is present in an amount from about 5 to about 25%.

10. The composition of claim 9 wherein the proportion, by volume, of propylene carbonate to propylene glycol is greater than 1:1.

11. In the method of heat exchange wherein a material at one temperature is contacted with a liquid at another temperature and wherein a temperature below the freezing point of water is encountered by said liquid at least some time during its use, the improvement wherein said liquid is the composition of claim 1.

12. In the method of inhibiting the accumulation of ice on a cold solid surface wherein said surface is contacted with a defrosting liquid, the improvement wherein said defrosting liquid is the composition of claim 4.

13. In the method of inhibiting the accumulation of ice on a cold solid surface wherein said surface is contacted with a defrosting liquid, the improvement wherein said defrosting liquid is the composition of claim 9.

14. In the cooling of a material wherein said material is contacted with a liquid having a lower temperature until the material is cooled to the desired extent, the improvement wherein said liquid is the composition of claim 4.

15. In the cooling of a material wherein said material is contacted with a liquid having a lower temperature until the material is cooled to the desired extend, the improvement wherein said liquid is the composition of claim 9.